United States Patent
Tenno

(10) Patent No.: US 10,629,988 B2
(45) Date of Patent: Apr. 21, 2020

(54) ANTENNA DEVICE AND ELECTRONIC DEVICE

(71) Applicant: Murata Manufacturing Co., Ltd., Nagaokakyo-shi, Kyoto-fu (JP)

(72) Inventor: Nobuyuki Tenno, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 248 days.

(21) Appl. No.: 15/581,144

(22) Filed: Apr. 28, 2017

(65) Prior Publication Data

US 2017/0229772 A1  Aug. 10, 2017

Related U.S. Application Data

(63) Continuation of application No. PCT/JP2016/052867, filed on Feb. 1, 2016.

(30) Foreign Application Priority Data

Feb. 2, 2015 (JP) ................. 2015-018697

(51) Int. Cl.
*H01Q 1/52* (2006.01)
*H01Q 7/00* (2006.01)
(Continued)

(52) U.S. Cl.
CPC ......... *H01Q 1/521* (2013.01); *G06K 7/10356* (2013.01); *H01Q 1/2216* (2013.01);
(Continued)

(58) Field of Classification Search
CPC ...... G06K 7/10356; H01Q 7/00; H01Q 7/005; H01Q 7/02; H01Q 7/04; H01Q 7/06; H01Q 7/08; H01Q 1/2225; H01Q 1/2233
See application file for complete search history.

(56) References Cited

U.S. PATENT DOCUMENTS 5,561,438 A    10/1996  Nakazawa et al.
5,977,927 A *  11/1999  Mandai ............... H01Q 1/38
                                                343/788
(Continued)

FOREIGN PATENT DOCUMENTS

JP    05-218726 A     8/1993
JP    2003-016409 A   1/2003
(Continued)

OTHER PUBLICATIONS

Official Communication issued in International Patent Application No. PCT/JP2016/052867, dated Mar. 8, 2016.
(Continued)

*Primary Examiner* — Daniel Munoz
(74) *Attorney, Agent, or Firm* — Keating & Bennett, LLP

(57) ABSTRACT

An antenna device includes an insulating substrate, a coil antenna including a helically wound coil conductor and at least two mounting electrodes conducted to the coil conductor, and a wiring conductor disposed on the substrate and including connection portions connected to the mounting electrodes of the coil antenna. The wiring conductor includes a first wiring conductor parallel extending portion and a second wiring conductor parallel extending portion, and directions of currents flowing through the first wiring conductor parallel extending portion and the second wiring conductor parallel extending portion are opposite to each other with respect to a direction of a current flowing through the coil conductor.

13 Claims, 8 Drawing Sheets

(51) Int. Cl.
  *H01Q 21/00* (2006.01)
  *G06K 7/10* (2006.01)
  *H01Q 1/22* (2006.01)
  *H01Q 1/36* (2006.01)
  *H04B 5/00* (2006.01)

(52) U.S. Cl.
  CPC ............... *H01Q 1/362* (2013.01); *H01Q 7/00* (2013.01); *H01Q 21/00* (2013.01); *H04B 5/0037* (2013.01); *H04B 5/0081* (2013.01)

(56) References Cited

U.S. PATENT DOCUMENTS

| | | | | |
|---|---|---|---|---|
| 8,199,066 | B2* | 6/2012 | Kubo | G06K 7/10316 343/895 |
| 2009/0096694 | A1* | 4/2009 | Ito | G06K 19/07749 343/788 |
| 2010/0321267 | A1* | 12/2010 | Ito | H01Q 7/08 343/788 |
| 2014/0176384 | A1 | 6/2014 | Yosui et al. | |
| 2015/0207205 | A1 | 7/2015 | Kato et al. | |

FOREIGN PATENT DOCUMENTS

| | | |
|---|---|---|
| JP | 2008-211557 A | 9/2008 |
| JP | 2011-077702 A | 4/2011 |
| JP | 2014-107607 A | 6/2014 |
| JP | 2014-212573 A | 11/2014 |
| WO | 2013/183552 A1 | 12/2013 |

OTHER PUBLICATIONS

Official Communication issued in Japanese Patent Application No. 2016-573341, dated Jun. 6, 2017.

* cited by examiner

ANTENNA DEVICE AND ELECTRONIC DEVICE

CROSS REFERENCE TO RELATED APPLICATIONS

This application claims the benefit of priority to Japanese Patent Application No. 2015-018697 filed on Feb. 2, 2015 and is a Continuation Application of PCT Application No. PCT/JP2016/052867 filed on Feb. 1, 2016. The entire contents of each application are hereby incorporated herein by reference.

BACKGROUND OF THE INVENTION

1. Field of the Invention

The present invention relates to an antenna device for use in a near field radio communication system, and an electronic device including the antenna device.

2. Description of the Related Art

In an RFID in the HF band, such as NFC (Near Field Communication), that is mounted on a mobile terminal, a coil antenna that magnetically couples with a communication counterpart-side antenna is used.

For example, Japanese Unexamined Patent Application Publication No. 2003-16409 discloses a mobile device that includes an RFID tag and in which a coil antenna of the RFID tag is disposed within a case of the mobile device.

In Japanese Unexamined Patent Application Publication No. 2003-16409, the coil antenna is disposed within the case of the device, but Japanese Unexamined Patent Application Publication No. 2003-16409 does not disclose a connection structure with a wiring conductor provided on a printed wiring board.

To provide a coil antenna within a mobile electronic device, it makes sense to configure the coil antenna as a surface-mountable component and mount the coil antenna on the printed wiring board similarly to other electronic components.

However, as a result of research performed by the inventor of the present invention, it has been discovered that unnecessary coupling between the wiring conductor and the coil antenna becomes a problem or the wiring conductor has an effect on the characteristics of the antenna device. For example, a problem has been discovered that due to unnecessary coupling between the wiring conductor and the coil antenna or the inductance of the wiring conductor, the characteristics of the coil antenna as a single component and the characteristics of the coil antenna in a state where the coil antenna is mounted on the board may differ greatly from each other.

The problem of unnecessary coupling between the wiring conductor and the coil antenna or the inductance of the wiring conductor has also not been considered in Japanese Unexamined Patent Application Publication No. 2003-16409 and has not been recognized in the relevant technical field.

SUMMARY OF THE INVENTION

Preferred embodiments of the present invention provide antenna devices that reduce or prevent interaction between a wiring conductor and a coil antenna provided on a board, such as a printed wiring board, and that have stable characteristics, and electronic devices including such antenna devices.

An antenna device according to a preferred embodiment of the present invention includes an insulating substrate including a principal surface, a coil antenna including a helically wound coil conductor and at least two mounting electrodes connected to the coil conductor, and a wiring conductor disposed on the principal surface of the substrate and/or within the substrate and including at least two connection portions connected to the mounting electrodes of the coil antenna, respectively, wherein the wiring conductor includes a first wiring conductor parallel extending portion and a second wiring conductor parallel extending portion extending parallel or substantially parallel and adjacent to each other, and directions of currents flowing through the first wiring conductor parallel extending portion and the second wiring conductor parallel extending portion are opposite to each other due to a direction of a current flowing through the coil conductor.

With this configuration, unnecessary magnetic coupling between the coil antenna and the wiring conductor is prevented. In addition, the inductance of the wiring conductor is reduced.

A distance between the first wiring conductor parallel extending portion and the second wiring conductor parallel extending portion is preferably smaller than a distance between the two connection portions. Accordingly, unnecessary magnetic coupling between the coil antenna and the wiring conductor is more effectively reduced or prevented.

The first wiring conductor parallel extending portion and the second wiring conductor parallel extending portion may be provided on layers (including surface layers) of the substrate that are different from each other. Accordingly, it is possible to make the interval between the first wiring conductor portion and the second wiring conductor portion smaller, so that the effect of reducing or preventing unnecessary magnetic coupling between the coil antenna and the wiring conductor and the effect of reducing the inductance of the wiring conductor are improved.

Preferably, the coil antenna has a winding axis parallel or substantially parallel to the principal surface of the substrate, and in a plan view of the substrate, the coil antenna overlaps the first wiring conductor parallel extending portion, and an end portion of the coil antenna is aligned or substantially aligned with an edge portion of the second wiring conductor parallel extending portion or overlaps the second wiring conductor parallel extending portion. Accordingly, a magnetic flux passing between the first wiring conductor portion and the second wiring conductor portion is reduced, so that the effect of reducing or preventing unnecessary magnetic coupling between the coil antenna and the wiring conductor is improved.

An electronic device according to a preferred embodiment of the present invention includes an antenna device including an insulating substrate that includes a principal surface, a coil antenna including a helically wound coil conductor and at least two mounting electrodes connected to the coil conductor, and a wiring conductor disposed on the principal surface of the substrate and/or within the substrate and including at least two connection portions connected to the mounting electrodes of the coil antenna, respectively, and a power supply circuit connected to the coil conductor of the antenna device, wherein the wiring conductor includes a first wiring conductor parallel extending portion and a second wiring conductor parallel extending portion extending parallel or substantially parallel and adjacent to each other, and directions of currents flowing through the first wiring conductor parallel extending portion and the second wiring conductor parallel extending portion are opposite to each other due to a direction of a current flowing through the coil conductor.

According to various preferred embodiments of the present invention, unnecessary magnetic coupling between the coil antenna and the wiring conductor is reduced or prevented, and the inductance of the wiring conductor is also reduced. Thus, interaction between the wiring conductor and the coil antenna provided on the board, such as a printed wiring board, is reduced or prevented, and an antenna device having stable characteristics and an electronic device including the antenna device are obtained.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
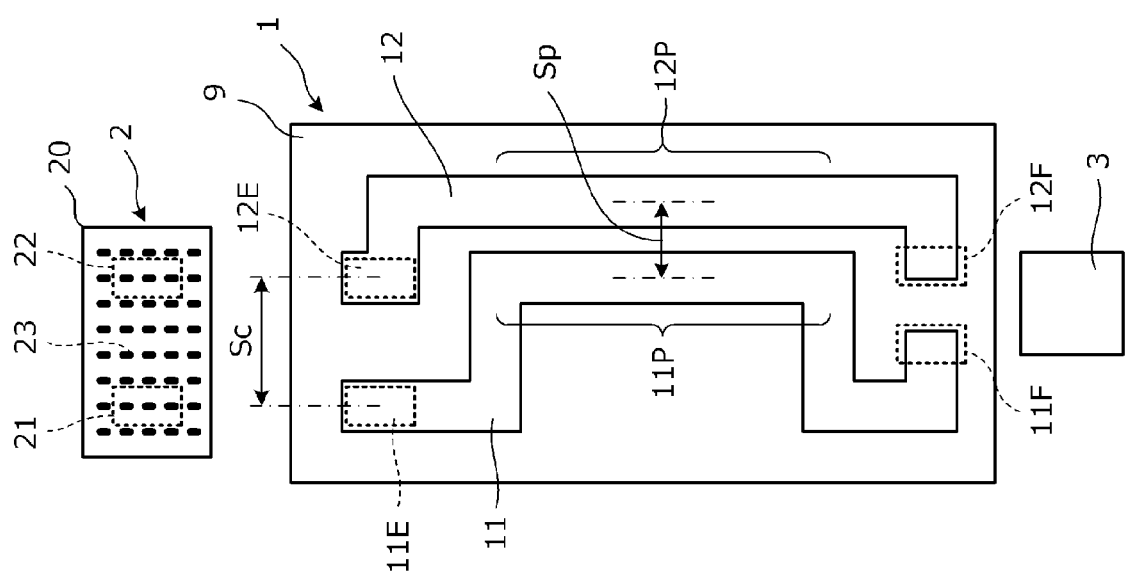
FIG. 1A is an exploded plan view of an antenna device 101 according to a first preferred embodiment of the present invention.

Hereinafter, preferred embodiments of the present invention will be described with reference to the drawings. In the drawings, like elements are designated by like reference signs. In a second preferred embodiment and subsequent preferred embodiments, the description of matters identical to those in a first preferred embodiment is omitted, and the differences from the first preferred embodiment will be described. In particular, like advantageous effects achieved by like configurations are not mentioned in each preferred embodiment.

In each preferred embodiment described below, the "antenna device" preferably is an antenna that radiates a magnetic flux, for example. The antenna device preferably is an antenna that is used for near field communication (NFC) using magnetic coupling with a communication counterpart-side antenna, and is used for communication, such as NFC, for example. The antenna device is preferably used, for example, in the HF band, particularly at 13.56 MHz or a frequency of approximately 13.56 MHz. The size of the antenna device is significantly smaller than a wavelength λ at the used frequency, and the electromagnetic wave radiation characteristics are poor in the used frequency band. The size of the antenna device is preferably equal to or smaller than about λ/10, for example. Here, the wavelength refers to an effective wavelength that takes into consideration a wavelength shortening effect by dielectricity or magnetic permeability of a substrate on which the antenna is provided.

In each preferred embodiment described below, the "electronic device" refers to various electronic devices including a cellular phone, such as a smartphone or a feature phone, a wearable terminal, such as a smart watch or smart glasses, a notebook PC, a tablet terminal, a camera, a game apparatus, a toy, and information medium, such as an IC tag, an SD card, a SIM card, or an IC card, for example.

First Preferred Embodiment

Figure 1B:
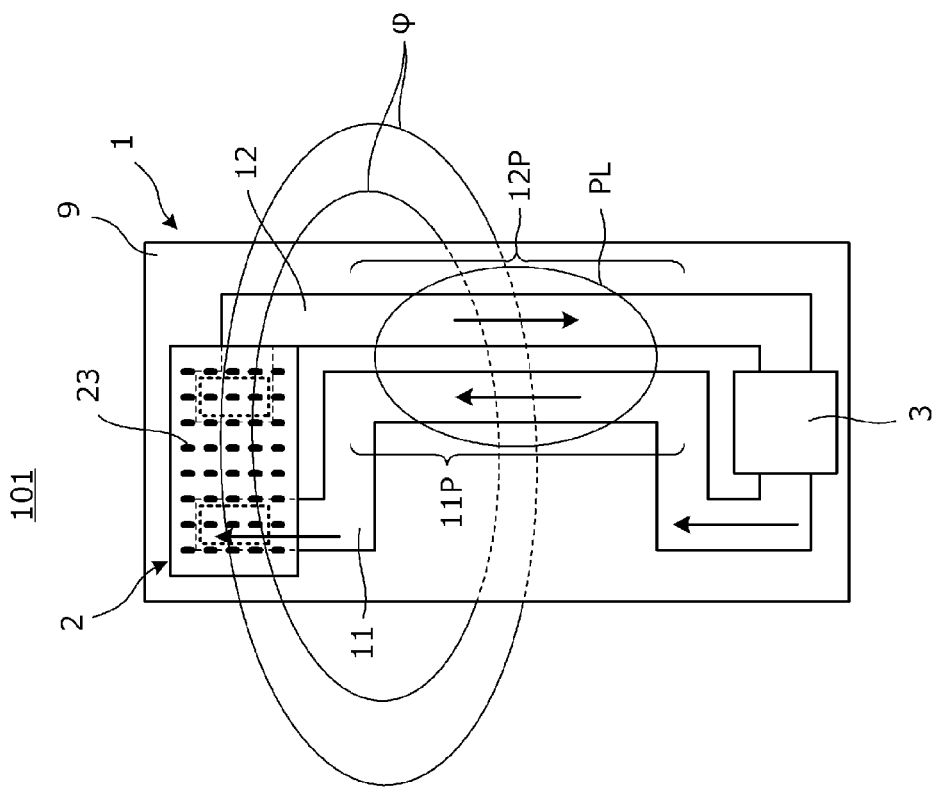
FIG. 1B is a plan view of the antenna device 101 according to the first preferred embodiment of the present invention.

FIG. 1A is an exploded plan view of an antenna device according to a first preferred embodiment of the present invention, and FIG. 1B is a plan view of the antenna device 101 according to the first preferred embodiment of the present invention. The antenna device 101 includes a board 1, a coil antenna 2, and an RFIC 3. The board 1 includes an insulating substrate 9, and a first wiring conductor 11 and a second wiring conductor 12 that are provided on a principal surface (surface shown in FIGS. 1A and 1B) of the substrate 9.

The coil antenna 2 includes a helically wound coil conductor 23 and two mounting electrodes 21 and 22 connected to the coil conductor 23.

The first wiring conductor 11 includes a coil antenna connection portion 11E, an RFIC connection portion 11F, and a first wiring conductor parallel extending portion 11P. The second wiring conductor 12 includes a coil antenna connection portion 12E, an RFIC connection portion 12F, and a second wiring conductor parallel extending portion 12P. The first wiring conductor parallel extending portion 11P and the second wiring conductor parallel extending portion 12P extend parallel or substantially parallel and adjacent to each other. Here, "extending parallel or substantially parallel" means that two wiring conductors are disposed so as to extend parallel or substantially parallel and adjacent to one another within a range of about ±45°, for example.

The mounting electrodes 21 and 22 of the coil antenna 2 are connected to the coil antenna connection portions 11E and 12E, respectively. The RFIC 3 is connected to the RFIC connection portions 11F and 12F. The RFIC 3 is an example of a "power supply circuit". As described above, the coil antenna 2 and the RFIC (power supply circuit) 3 are connected to each other via the first wiring conductor 11 and the second wiring conductor 12 so as to define a closed loop.

In FIG. 1B, the directions of currents flowing through the first wiring conductor 11 and the second wiring conductor 12 at certain timing (phase) are shown by arrows. As shown in FIG. 1B, the directions of the currents flowing through the first wiring conductor parallel extending portion 11P and the second wiring conductor parallel extending portion 12P are opposite to each other due to the direction of a current flowing through the coil conductor 23.

An interval Sp between the first wiring conductor parallel extending portion 11P and the second wiring conductor parallel extending portion 12P is smaller than a normal arrangement pitch of a wiring conductor pattern. In the present preferred embodiment, the interval Sp between the first wiring conductor parallel extending portion 11P and the second wiring conductor parallel extending portion 12P is preferably smaller than an interval Sc between the coil antenna connection portions 11E and 12E. Here, the interval Sp is the interval between the center of the line width of the first wiring conductor parallel extending portion 11P and the center of the line width of the second wiring conductor parallel extending portion 12P, and the interval Sc is the interval between the center of the line width of the coil antenna connection portion 11E and the center of the line width of the coil antenna connection portion 12E.

Figure 2:
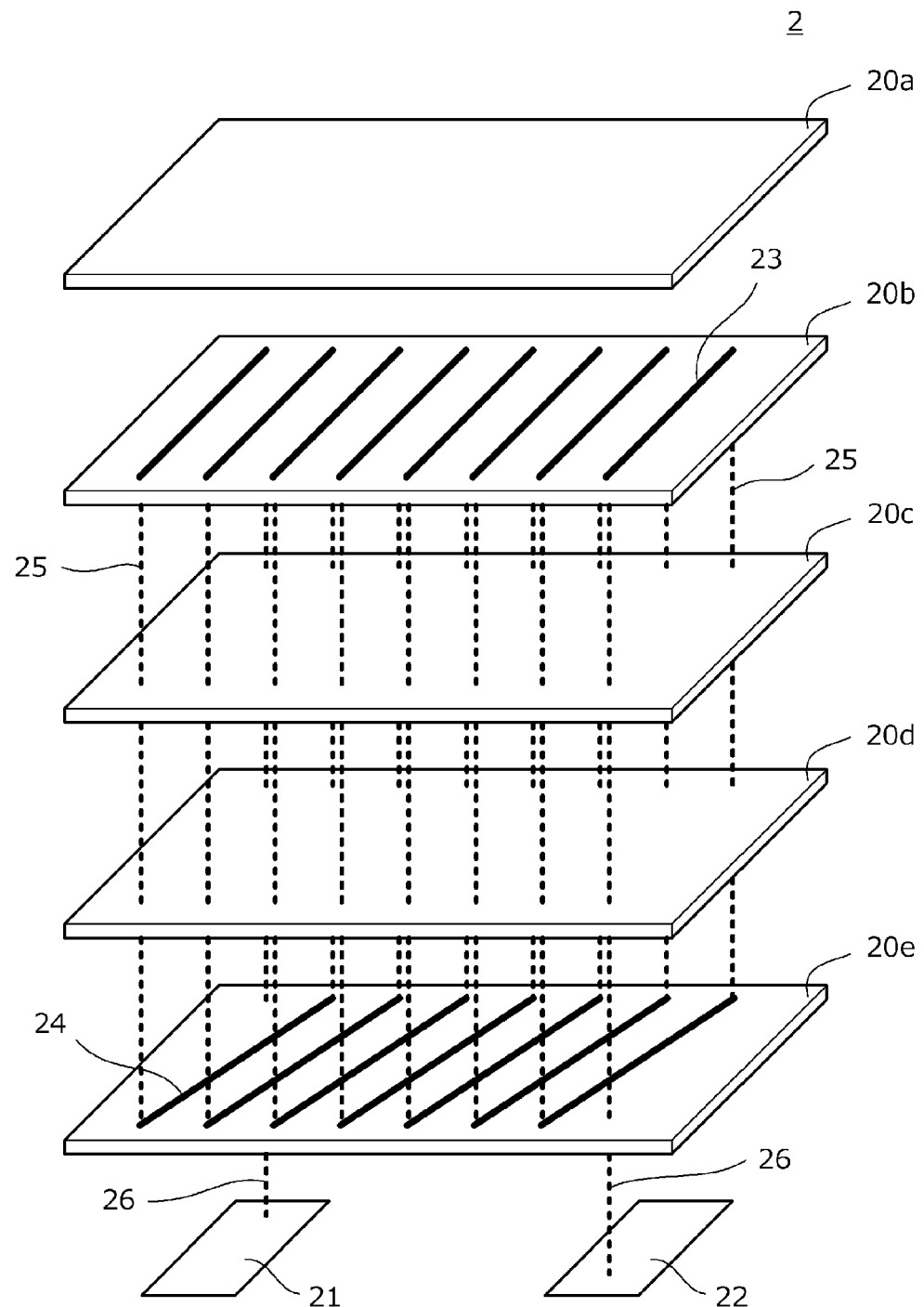
FIG. 2 is an exploded perspective view showing the configuration of a coil antenna 2.

FIG. 2 is an exploded perspective view showing the internal configuration of the coil antenna 2. The coil antenna 2 includes substrate layers 20a, 20b, 20c, 20d, and 20e and a conductor pattern provided on predetermined substrate layers of the substrate layers. The substrate layers 20b, 20c, and 20d are magnetic material layers, and the substrate layers 20a and 20e are nonmagnetic material layers. The magnetic material layers define and function as a magnetic material core of the coil antenna.

A plurality of coil conductors 23 are provided on the upper surface of the substrate layer 20b, and a plurality of coil conductors 24 are provided on the upper surface of the substrate layer 20e. Interlayer connection conductors (via-conductors) 25 that interlayer-connect the coil conductors 23 and 24 are provided in the substrate layers 20b, 20c, and 20d. The mounting electrodes 21 and 22 are provided on the lower surface of the substrate layer 20e. End portions of the coil conductors 23 at both ends in the direction in which the plurality of coil conductors 23 are arranged are connected to the mounting electrodes 21 and 22 via interlayer connection conductors 26. In this manner, the coil antenna 2 is preferably a surface-mount chip component.

Figure 3A:
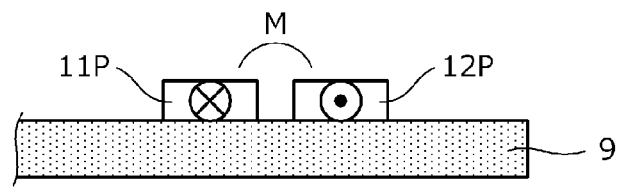
FIG. 3A is a cross-sectional view of a first wiring conductor parallel extending portion 11P and a second wiring conductor parallel extending portion 12P provided on a substrate 9.

FIG. 3A is a cross-sectional view of a portion of the first wiring conductor parallel extending portion 11P and the second wiring conductor parallel extending portion 12P provided on the substrate 9. The directions of currents at the certain timing (phase) are represented by a dot mark and a cross mark. Since the first wiring conductor parallel extending portion 11P and the second wiring conductor parallel extending portion 12P adjacently extend parallel or substantially parallel and adjacent to each other, a mutual inductance M occurs at the first wiring conductor parallel extending portion 11P and the second wiring conductor parallel extending portion 12P.

When the inductance of the first wiring conductor parallel extending portion 11P as a single component is represented by L1, and the inductance of the second wiring conductor parallel extending portion 12P as a single component is represented by L2, the inductance of the first wiring conductor parallel extending portion 11P that takes into consideration the mutual inductance M is represented by L1+M, and the inductance of the second wiring conductor parallel extending portion 12P that takes into consideration the mutual inductance M is represented by L2+M. Regarding the current flowing via the first wiring conductor parallel extending portion 11P and the second wiring conductor parallel extending portion 12P to the coil antenna 2, the direction in the first wiring conductor parallel extending portion 11P is opposite to the direction in the second wiring conductor parallel extending portion 12P. Thus, the mutual inductance M is negative. Therefore, the inductance of each of the first wiring conductor parallel extending portion 11P and the second wiring conductor parallel extending portion 12P is lower than the inductance thereof as a single component.

Figure 3B:
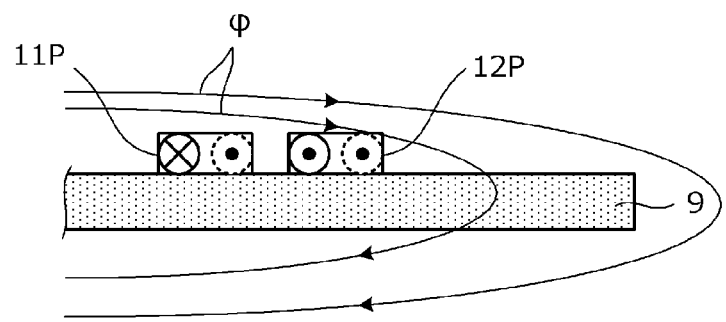
FIG. 3B is a cross-sectional view showing a magnetic flux φ that links with the first wiring conductor parallel extending portion 11P and the second wiring conductor parallel extending portion 12P.

FIG. 3B is a cross-sectional view showing a magnetic flux φ that links with the first wiring conductor parallel extending portion 11P and the second wiring conductor parallel extending portion 12P. The magnetic flux φ is a magnetic flux generated by the coil antenna 2. Since the first wiring conductor parallel extending portion 11P and the second wiring conductor parallel extending portion 12P adjacently extend parallel or substantially parallel and adjacent to each other, the magnetic flux φ generated by the coil antenna 2 links with both of the first wiring conductor parallel extending portion 11P and the second wiring conductor parallel extending portion 12P.

Figure 3C:
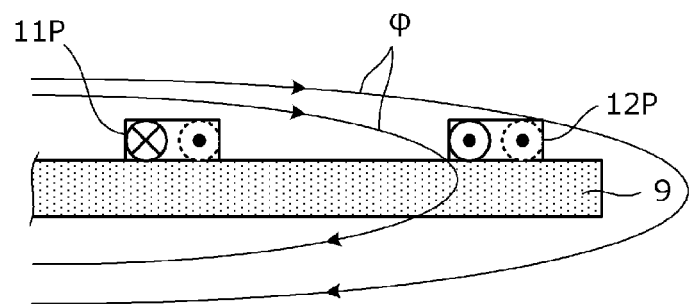
FIG. 3C is a cross-sectional view showing a magnetic flux φ that links with a first wiring conductor parallel extending portion 11P and a second wiring conductor parallel extending portion 12P in an antenna device of a comparative example.

FIG. 3C is a cross-sectional view showing a magnetic flux φ that links with a first wiring conductor parallel extending portion 11P and a second wiring conductor parallel extending portion 12P in an antenna device of a comparative example. In the comparative example, the first wiring conductor parallel extending portion 11P and the second wiring conductor parallel extending portion 12P are not adjacent to each other. Thus, a portion of the magnetic flux φ generated by the coil antenna 2 passes between the first wiring conductor parallel extending portion 11P and the second wiring conductor parallel extending portion 12P. With the antenna device of the comparative example, the magnetic flux φ generated by the coil antenna 2 is very different from the amount of the magnetic flux that links with the first wiring conductor parallel extending portion 11P and the amount of the magnetic flux that links with the second wiring conductor parallel extending portion 12P. As a result, coupling between the coil antenna 2 and the first wiring conductor parallel extending portion 11P and the second wiring conductor parallel extending portion 12P occurs.

In the antenna device of the present preferred embodiment, as shown in FIG. 3B, since the first wiring conductor parallel extending portion 11P and the second wiring conductor parallel extending portion 12P are adjacent to each other, the magnetic flux φ generated by the coil antenna 2 is substantially equal to the amount of the magnetic flux that links with the first wiring conductor parallel extending portion 11P and the second wiring conductor parallel extending portion 12P. Here, the directions of the currents in the first wiring conductor parallel extending portion 11P and the second wiring conductor parallel extending portion 12P are opposite to each other (have a relationship of "positive" and "negative"), the signs of the magnetic fluxes that link therewith are different from each other. Thus, it is possible to reduce or prevent coupling between the coil antenna 2 and the first wiring conductor parallel extending portion 11P and the second wiring conductor parallel extending portion 12P.

The intensity of the magnetic flux φ generated by the coil antenna 2 becomes higher as the magnetic flux φ gets closer to the coil antenna 2. In the case of providing wiring conductors close to the coil antenna 2, the first wiring conductor parallel extending portion 11P and the second wiring conductor parallel extending portion 12P are more effective when the first wiring conductor parallel extending portion 11P and the second wiring conductor parallel extending portion 12P are provided closer to the coil antenna 2. Therefore, in the case of providing wiring conductors close to the coil antenna 2, the first wiring conductor parallel extending portion 11P and second wiring conductor parallel extending portion 12P are preferably provided close to the coil antenna 2.

According to the present preferred embodiment, variations of the characteristics of the coil antenna 2 are reduced or prevented between a state where the coil antenna 2 is mounted on the board 1 and a state before the coil antenna 2 is mounted on the board 1 (the coil antenna 2 as a single component).

The "principal surface" of the substrate 9 is not limited to the surface (front surface) shown in FIGS. 1A and 1B and includes a back surface. That is, the first wiring conductor 11 and the second wiring conductor 12 may be provided on the back surface of the substrate 9. In addition, the first wiring conductor 11 and the second wiring conductor 12 may be provided on each of the front surface and the back surface of the substrate 9. Moreover, the first wiring conductor 11 and the second wiring conductor 12 may be provided on an internal layer of the substrate 9 in addition to the principal surface (front and back surfaces) of the substrate 9. Furthermore, the first wiring conductor 11 and the second wiring conductor 12 may be provided on both of the principal surface and within the substrate 9. The definition of the "principal surface" and limitations on the positions at which the wiring conductors are provided also apply to other preferred embodiments described below, in addition to the present preferred embodiment.

Second Preferred Embodiment

Figure 4A:
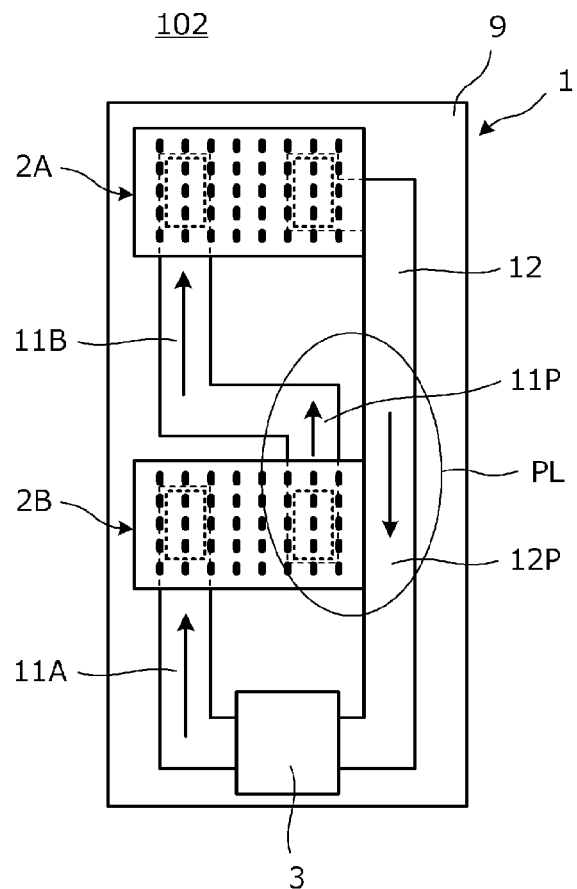
FIG. 4A is a plan view of an antenna device 102 according to a second preferred embodiment of the present invention.
Figure 4B:
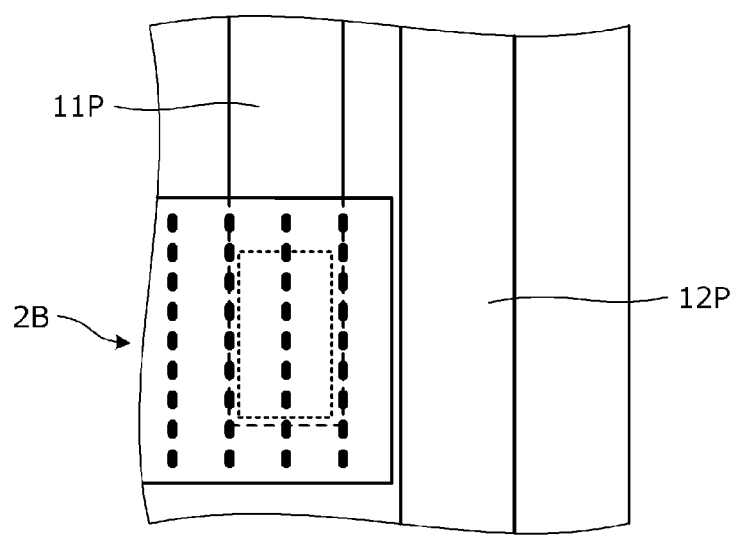
FIG. 4B is an enlarged plan view of a parallel extending portion PL of the antenna device 102.

FIG. 4A is a plan view of an antenna device 102 according to the second preferred embodiment of the present invention. FIG. 4B is an enlarged plan view of a parallel extending portion PL of the antenna device 102.

The antenna device 102 includes a board 1, coil antennas 2A and 2B, and an RFIC 3. The board 1 includes first wiring conductors 11A and 11B and a second wiring conductor 12.

Each of the coil antennas 2A and 2B includes a helically wound coil conductor and mounting electrodes. The coil antennas 2A and 2B are the same or substantially the same as the coil antenna 2 described in the first preferred embodiment. The coil antennas 2A and 2B each include a winding axis that is parallel or substantially parallel and adjacent to a principal surface of the substrate 9.

Unlike the antenna device 101 described in the first preferred embodiment, the antenna device 102 of the present preferred embodiment preferably includes the two coil antennas 2A and 2B, and the two coil antennas 2A and 2B are connected in series with each other via the first wiring conductors 11A and 11B and the second wiring conductor 12. A portion of the first wiring conductor 11B is a first wiring conductor parallel extending portion 11P. In FIG. 4A, the directions of currents flowing through the first wiring conductors 11A and 11B and the second wiring conductor 12 at certain timing (phase) are shown by arrows.

Figure 5:
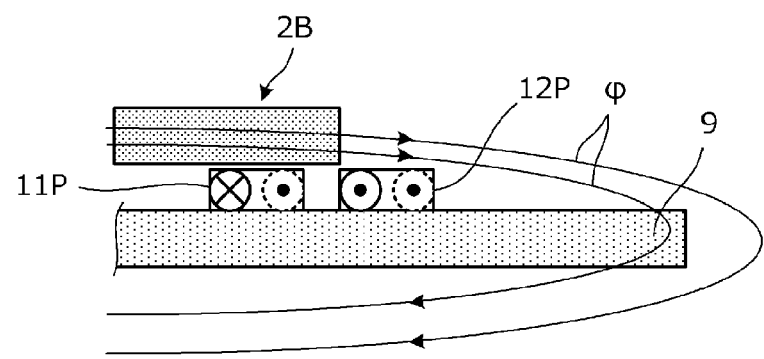
FIG. 5 is a cross-sectional view of a first wiring conductor parallel extending portion 11P and a second wiring conductor parallel extending portion 12P provided on a substrate 9.

FIG. 5 is a cross-sectional view of a portion of the first wiring conductor parallel extending portion 11P and a second wiring conductor parallel extending portion 12P provided on the substrate 9. The directions of the currents at the certain timing (phase) are represented by a dot mark and a cross mark.

In the case where the coil antenna 2B is close to the parallel extending portion PL defined by the first wiring conductor parallel extending portion 11P and the second wiring conductor parallel extending portion 12P as in the present preferred embodiment, the coil antenna 2B overlaps the first wiring conductor parallel extending portion 11P, and an end portion of the coil antenna 2B is aligned or substantially aligned with an edge portion of the second wiring conductor parallel extending portion 12P or overlaps the second wiring conductor parallel extending portion 12P.

Since the density of a magnetic flux is high near a cavity of the coil antenna 2B, coupling between the wiring conductor and the coil antenna 2B is effectively reduced or prevented by configuring this portion as the parallel extending portion PL.

The magnetic flux flows in and out through end surfaces of the coil antenna 2B. Thus, when the board 1 is seen in a plan view, preferably, the coil antenna 2B overlaps the first wiring conductor parallel extending portion 11P, and the end portion of the coil antenna 2B overlaps the second wiring conductor parallel extending portion 12P or be aligned or substantially aligned with the edge portion of the second wiring conductor parallel extending portion 12P. Because of this structure, as shown in FIG. 5, the magnetic flux from the coil antenna 2B links with both of the first wiring conductor parallel extending portion 11P and the second wiring conductor parallel extending portion 12P along the front surface of the second wiring conductor parallel extending portion 12P. Thus, coupling between the coil antenna 2B and the first wiring conductors 11A and 11B and the second wiring conductor 12 is sufficiently reduced or prevented. It should be noted that it is possible to achieve this effect when at least a portion of the coil antenna 2B overlaps the first wiring conductor parallel extending portion 11P and at least a portion of the end portion of the coil antenna 2B is aligned or substantially aligned with the edge portion of the second wiring conductor parallel extending portion 12P or overlaps the second wiring conductor parallel extending portion 12P.

Similarly to the first preferred embodiment, since the first wiring conductor parallel extending portion 11P and the second wiring conductor parallel extending portion 12P adjacently extend parallel or substantially parallel and adjacent to each other, the inductance of each of the first wiring conductor parallel extending portion 11P and the second wiring conductor parallel extending portion 12P is lower than the inductance thereof as a single component.

Although FIGS. 4A and 4B show the antenna device including the two coil antennas, three or more coil antennas may also be similarly provided. In addition, although the antenna device in which the two coil antennas are connected in series has been described, two coil antennas may be connected in parallel. In the case where three or more coil antennas are provided, a series connection and a parallel connection may be provided. If the coil antennas are connected in series, the inductance of the antenna device is able to be increased, and if the coil antennas are connected in parallel, loss is able to be reduced.

Third Preferred Embodiment

Figure 6:
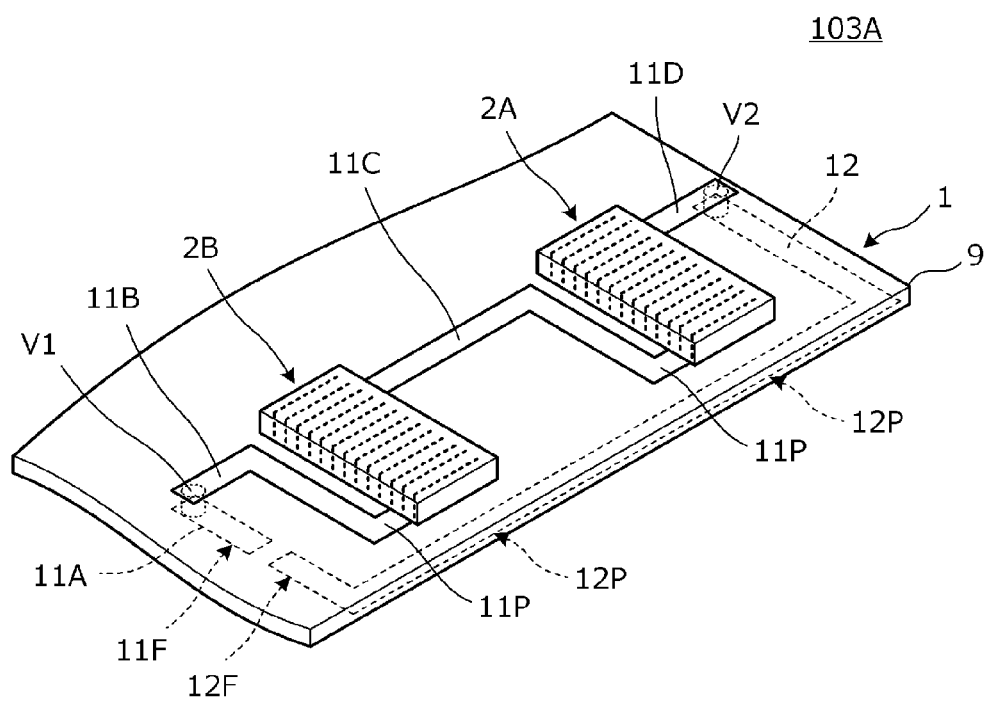
FIG. 6 is a perspective view of an antenna device 103A according to a third preferred embodiment of the present invention.
Figure 7A:
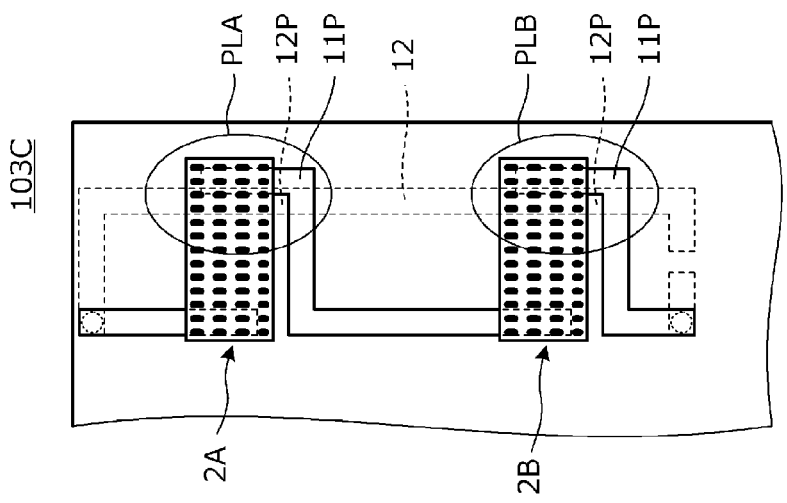
FIG. 7A is a plan view of the antenna device 103A.
Figure 7B:
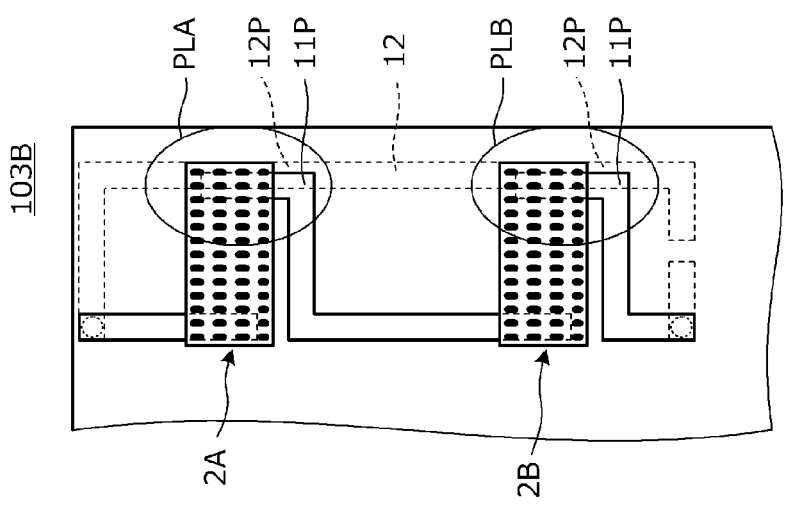
FIGS. 7B and 7C are plan views of antenna devices 103B and 103C of modifications.
Figure 7C:
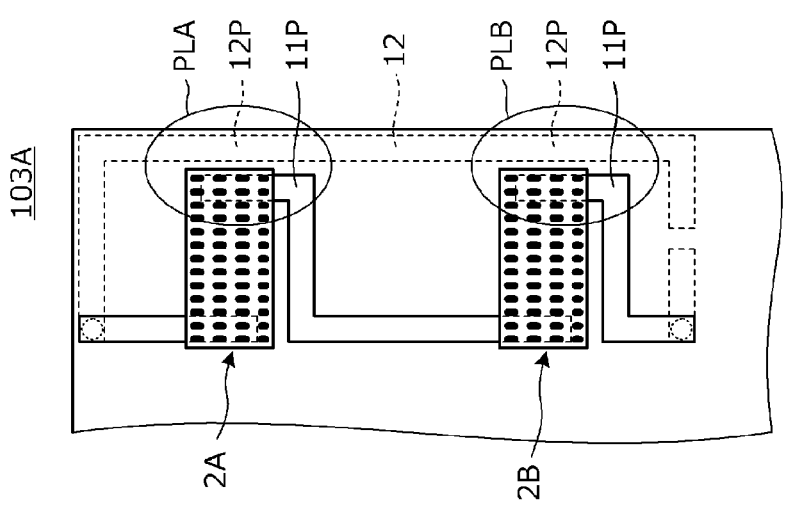

FIG. 6 is a perspective view of an antenna device 103A according to a third preferred embodiment of the present invention. FIG. 7A is a plan view of the antenna device 103A. FIGS. 7B and 7C are plan views of antenna devices 103B and 103C, which are modifications of the antenna device 103A. An RFIC is not shown in FIGS. 7A-7C.

The antenna device 103A includes a board 1, coil antennas 2A and 2B, and an RFIC. The board 1 includes first wiring conductors 11A, 11B, 11C, and 11D and a second wiring conductor 12. The first wiring conductors 11B, 11C, and 11D are provided on the upper surface of a substrate 9, and the first wiring conductor 11A and the second wiring conductor 12 are provided on the lower surface of the substrate 9. The first wiring conductor 11A and the first wiring conductor 11B are connected to each other by a via-conductor V1, and the first wiring conductor 11D and the second wiring conductor 12 are connected to each other by a via-conductor V2.

Each of the coil antennas 2A and 2B includes a helically wound coil conductor and mounting electrodes. The coil antennas 2A and 2B are the same or substantially the same as the coil antenna 2 described in the first preferred embodiment.

One end of the first wiring conductor 11A is an RFIC connection portion 11F, and one end of the second wiring conductor is an RFIC connection portion 12F. The RFIC is connected (mounted) to the RFIC connection portions 11F and 12F.

Unlike the antenna device 101 described in the first preferred embodiment, the antenna device 103A of the present preferred embodiment preferably includes the two coil antennas 2A and 2B, and the two coil antennas 2A and 2B are connected in series via the first wiring conductors 11A, 11B, 11C, and 11D and the second wiring conductor 12.

A portion of the first wiring conductor 11B is a first wiring conductor parallel extending portion 11P. Similarly, a portion of the first wiring conductor 11C is a first wiring conductor parallel extending portion 11P.

As shown in FIG. 7A, in the antenna device 103A, each first wiring conductor parallel extending portion 11P does not overlap the second wiring conductor parallel extending portion 12P in a plan view. As shown in FIG. 7B, in the antenna device 103B, each first wiring conductor parallel extending portion 11P overlaps the second wiring conductor parallel extending portion 12P in a plan view. In addition, as shown in FIG. 7C, in the antenna device 103C, each first wiring conductor parallel extending portion 11P overlaps the second wiring conductor parallel extending portion 12P in a plan view.

By providing the first wiring conductor parallel extending portion 11P and the second wiring conductor parallel extending portion 12P on different surfaces (layers) of the substrate 9 as in the present preferred embodiment, it is possible to make the interval between the first wiring conductor parallel extending portion 11P and the second wiring conductor parallel extending portion 12P smaller. Because of this, it is possible to improve the effect of decreasing the inductance and the effect of reducing or preventing coupling with the coil antennas 2A and 2B.

In the example shown in FIG. 6, the configuration in which the RFIC is connected to the RFIC connection portions 11F and 12F is shown. However, in a case where one of the coil antennas 2A and 2B includes an RFIC (power supply circuit), it is not necessary to mount an individual RFIC. In this case, only a pattern is needed in which the RFIC connection portions 11F and 12F are continuously conducted.

FIGS. 6, 7A, 7B, and 7C each show the antenna device including the two coil antennas 2A and 2B. However, three or more coil antennas may be provided.

Fourth Preferred Embodiment

Figure 8:
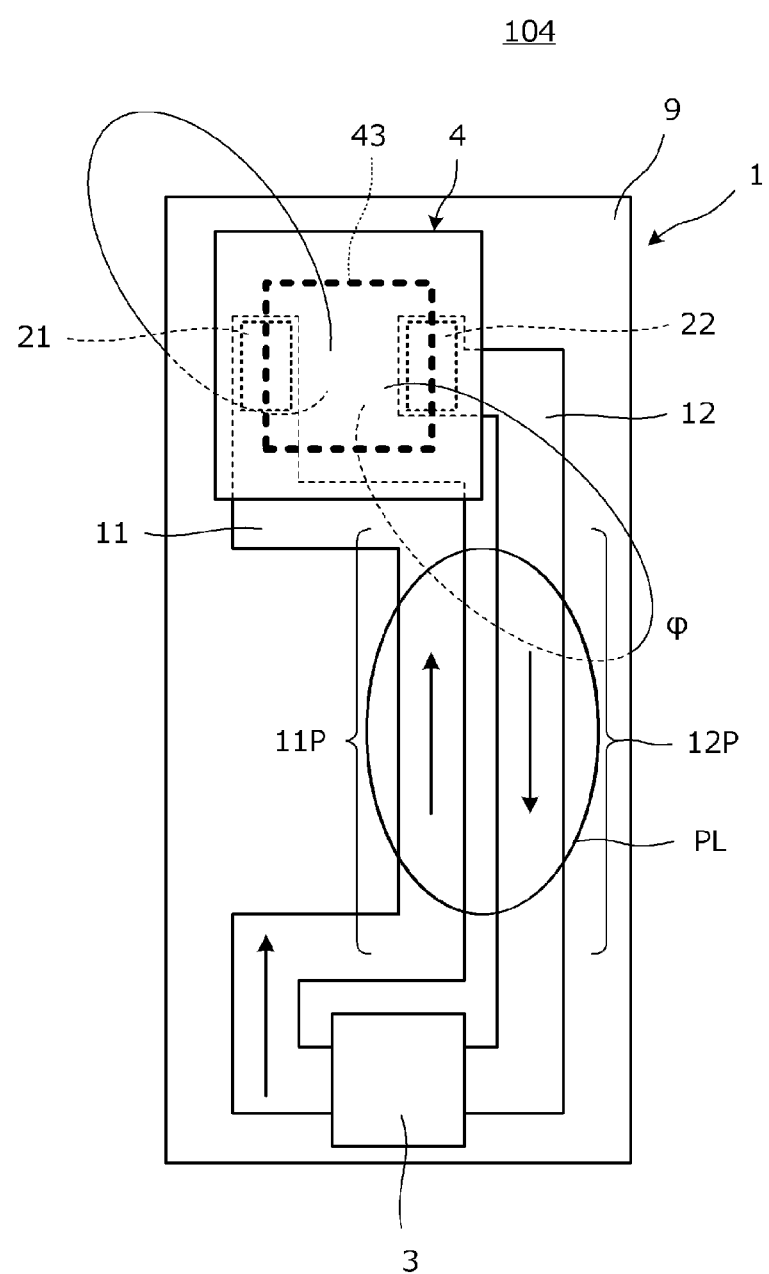
FIG. 8 is a plan view of an antenna device 104 according to a fourth preferred embodiment of the present invention.

FIG. 8 is a plan view of an antenna device 104 according to a fourth preferred embodiment of the present invention. The antenna device 104 includes a board 1, a coil antenna 4, and an RFIC 3. The board 1 includes a substrate 9, and a first wiring conductor 11 and a second wiring conductor 12 that are provided on a principal surface of the substrate 9.

The coil antenna 2 includes a helically wound coil conductor 43 and two mounting electrodes 21 and 22 connected to the coil conductor 43.

The coil antenna 4 includes a plurality of substrate layers, and loop-shaped conductor patterns and interlayer connection conductors provided on or in predetermined substrate layers of the substrate layers. The coil antenna 4 has a winding axis perpendicular or substantially perpendicular to the principal surface of the substrate 9. The other configuration is the same or substantially the same as that of the antenna device 101 described in the first preferred embodiment.

At least a portion of the first wiring conductor 11 close to the coil antenna 4 is provided as a first wiring conductor parallel extending portion 11P, and at least a portion of the second wiring conductor 12 close to the coil antenna 4 is provided as a second wiring conductor parallel extending portion 12P.

Also in the case of including the coil antenna 4 having a winding axis perpendicular or substantially perpendicular to the principal surface of the substrate 9 as in the antenna device of the present preferred embodiment, a magnetic flux φ generated by the coil antenna 4 links with the first wiring conductor 11 and the second wiring conductor 12. However, since the first wiring conductor parallel extending portion 11P and the second wiring conductor parallel extending portion 12P are adjacent to the coil antenna 4, the amounts of the magnetic flux φ generated from the coil antenna 4 is substantially equal to the amount of the magnetic flux that links with the first wiring conductor parallel extending portion 11P and the second wiring conductor parallel extending portion 12P. Thus, similarly to the antenna device 101 described in first preferred embodiment, an effect of decreasing the inductances of the wiring conductors 11 and 12 and an effect of reducing or preventing coupling with the coil antenna 4 are achieved.

Fifth Preferred Embodiment

In a fifth preferred embodiment of the present invention, an example of an electronic device will be described.

Figure 9:
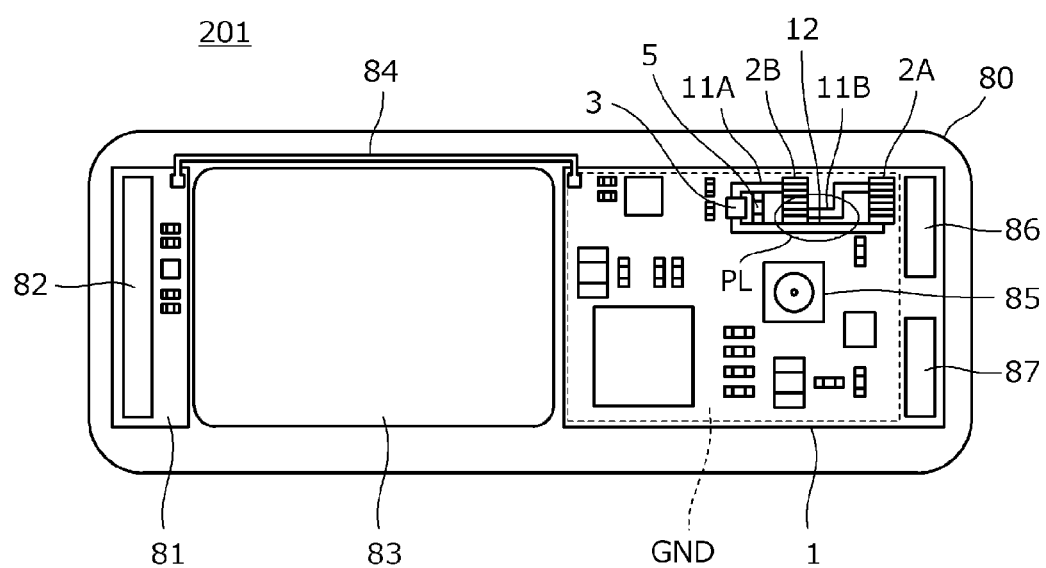
FIG. 9 is a plan view showing the internal structure of a housing of an electronic device 201 according to a fifth preferred embodiment of the present invention.

FIG. 9 is a plan view showing the internal structure of a housing of an electronic device 201 according to the fifth preferred embodiment. Within a housing 80, boards 1 and 81, and a battery pack 83, and other components are housed. First wiring conductors 11A and 11B and a second wiring conductor 12 are provided on the board 1. In addition, coil antennas 2A and 2B, an RFIC 3, and a capacitor 5 for providing resonance are mounted on the board 1.

A camera module 85, UHF band antennas 86 and 87, and other components are also mounted on the board 1. In addition, a UHF band antenna 82 is mounted on the board 81. The board 1 and the board 81 are connected to each other via a cable 84.

An LC resonant circuit is defined primarily by the inductance components of the coil antennas 2A and 2B, the first wiring conductors 11A and 11B, and the second wiring conductor 12, a capacitance component included in the RFIC 3, and the capacitance of the capacitor 5. The capacitor 5 described in the present preferred embodiment is a capacitor that adjusts the resonant frequency of the LC resonant circuit, and is not essential.

The configuration of the coil antennas 2A and 2B, the first wiring conductors 11A and 11B, and the second wiring conductor 12 is the same or substantially the same as that of the antenna device 102 described in the second preferred embodiment.

Because of the above configuration, variations of the characteristics of the coil antennas 2A and 2B are reduced or prevented between a state where the coil antennas 2A and 2B are mounted on the board 1 and a state before the coil antennas 2A and 2B are mounted on the board 1.

A ground conductor pattern GND is provided within the board 1 so as to extend in a planar manner. The coil antennas 2A and 2B are disposed at one edge of the ground conductor pattern. Thus, the ground conductor pattern GND electromagnetically couples with the coil antennas 2A and 2B, and an induced current flows through a large round path in the ground conductor pattern GND. That is, the ground conductor pattern GND also defines and functions as a booster antenna.

In each preferred embodiment described above, an operation in which a current flow from the RFIC 3 to the coil antennas 2, 2A, and 2B, and a magnetic flux of a transmission signal occurs from the coil antennas 2, 2A, and 2B, has been described. However, in the case where a magnetic flux from a communication counterpart-side antenna links with the coil antennas 2, 2A, and 2B, a current corresponding to a received signal flows through the first and second wiring conductors due to the reversibility of the antenna.

The antenna device and the electronic device in the communication system that primarily uses magnetic coupling of NFC or other suitable communication have been described in the above preferred embodiments. However, the antenna device and the electronic device in the above preferred embodiments may be similarly used in a non-contact power transmission system (electromagnetic induction type, magnetic resonance type, etc.) using magnetic coupling. For example, the antenna device in the above preferred embodiments is usable as a power receiving antenna device in a power receiving apparatus of a magnetic resonance non-contact power transmission system used in the HF band, particularly at 6.78 MHz or a frequency of approximately 6.78 MHz, for example. In this case as well, the antenna device defines and functions as a power receiving antenna device. In the non-contact power transmission system, the "power supply circuit" described in the above preferred embodiments corresponds to a power receiving circuit or a power transmitting circuit. In the case where the power supply circuit is a power receiving circuit, the power supply circuit is connected to a power receiving antenna device, and power is supplied to a load (e.g., a secondary battery). In addition, in the case where the power supply circuit is a power transmitting circuit, the power supply circuit is connected to a power transmitting antenna device, and power is supplied to the power transmitting antenna device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
   an insulating substrate including a principal surface and a plurality of layers;
   a coil antenna including a helically wound coil conductor and at least two mounting electrodes connected to the coil conductor; and
   a plurality of wiring conductors disposed on the principal surface of the substrate and/or within the substrate and each including at least two connection portions connected to the mounting electrodes of the coil antenna, respectively; wherein
   the plurality of wiring conductors include a first wiring conductor parallel extending portion and a second wiring conductor parallel extending portion that extend parallel or substantially parallel and adjacent to each other, and directions of currents flowing through the first wiring conductor parallel extending portion and the second wiring conductor parallel extending portion are opposite to each other with respect to a direction of a current flowing through the coil conductor;
   the first wiring conductor parallel extending portion and the second wiring conductor parallel extending portion are provided on different layers of the plurality of layers of the substrate; and
   a distance between the first wiring conductor parallel extending portion and the second wiring conductor parallel extending portion is smaller than a distance between the at least two connection portions.

2. The antenna device according to claim 1, further comprising:
   another coil antenna; wherein
   the another coil antenna includes a helically wound coil conductor and has a winding axis that is parallel or substantially parallel to the principal surface of the substrate.

3. The antenna device according to claim 2, wherein the coil antenna and the another coil antenna are connected in series with each other via the plurality of wiring conductors.

4. The antenna device according to claim 3, wherein the plurality of wiring conductors includes another first wiring conductor parallel extending portion that extends parallel or substantially parallel and adjacent to the second wiring conductor parallel extending portion.

5. The antenna device according to claim 1, wherein the coil antenna has a winding axis perpendicular or substantially perpendicular to the principal surface of the substrate.

6. The antenna device according to claim 1, wherein the coil antenna has a winding axis parallel or substantially parallel to the principal surface of the substrate.

7. The antenna device according to claim 1, wherein all of the at least two mounting electrodes are arranged on one side of the substrate.

8. An electronic device comprising:
   an antenna device including an insulating substrate including a principal surface and a plurality of layers, a coil antenna including a helically wound coil conductor and at least two mounting electrodes connected to the coil conductor, and a plurality of wiring conductors disposed on the principal surface of the substrate and/or within the substrate and each including at least two connection portions connected to the mounting electrodes of the coil antenna, respectively; and
   a power supply circuit connected to the coil conductor of the antenna device; wherein
   the plurality of wiring conductors include a first wiring conductor parallel extending portion and a second wiring conductor parallel extending portion that extend parallel or substantially parallel and adjacent to each other, and directions of currents flowing through the first wiring conductor parallel extending portion and the second wiring conductor parallel extending portion are opposite to each other due to a direction of a current flowing through the coil conductor;

the first wiring conductor parallel extending portion and the second wiring conductor parallel extending portion are provided on different layers of the plurality of layers of the substrate; and a distance between the first wiring conductor parallel extending portion and the second wiring conductor parallel extending portion is smaller than a distance between the two connection portions.

9. The electronic device according to claim 8, further comprising:

another coil antenna; wherein the another coil antenna includes a helically wound coil conductor and has a winding axis that is parallel or substantially parallel to the principal surface of the substrate.

10. The electronic device according to claim 9, wherein the coil antenna and the another coil antenna are connected in series with each other via the plurality of wiring conductors.

11. The electronic device according to claim 10, wherein the plurality of wiring conductors includes another first wiring conductor parallel extending portion that extend parallel or substantially parallel and adjacent to the second wiring conductor parallel extending portion.

12. The electronic device according to claim 8, wherein the coil antenna has a winding axis parallel or substantially parallel to the principal surface of the substrate.

13. The electronic device according to claim 8, wherein all of the at least two mounting electrodes are arranged on one side of the substrate.

* * * * *